US009307018B2

(12) United States Patent
DeCusatis et al.

(10) Patent No.: US 9,307,018 B2
(45) Date of Patent: Apr. 5, 2016

(54) WORKLOAD DEPLOYMENT WITH REAL-TIME CONSIDERATION OF GLOBAL NETWORK CONGESTION

(71) Applicant: International Business Machines Corporation, Armonk, NY (US)

(72) Inventors: Casimer M. DeCusatis, Poughkeepsie, NY (US); Mircea Gusat, Langnau (CH); Vinit Jain, Austin, TX (US); Keshav G. Kamble, Fremont, CA (US); Renato J. Recio, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 14/024,497

(22) Filed: Sep. 11, 2013

(65) Prior Publication Data

US 2015/0074276 A1  Mar. 12, 2015

(51) Int. Cl.
*G06F 15/173* (2006.01)
*H04L 29/08* (2006.01)
*H04L 12/729* (2013.01)
(Continued)

(52) U.S. Cl.
CPC .......... *H04L 67/1008* (2013.01); *H04L 45/125* (2013.01); *H04L 49/70* (2013.01); *H04L 45/64* (2013.01)

(58) Field of Classification Search
CPC ..... G06F 9/5044; G06F 9/505; G06F 9/5055; G06F 9/5083; H04L 47/1265; H04L 67/1004; H04L 67/1006; H04L 67/1008; H04L 67/101; H04L 45/64; H04L 45/125; H04L 49/70
See application file for complete search history.

(56) References Cited

U.S. PATENT DOCUMENTS

| 7,996,839 B2 * | 8/2011 | Farkas | G06F 9/5044 702/182 |
| 8,301,746 B2 | 10/2012 | Head et al. | |

(Continued)

FOREIGN PATENT DOCUMENTS

| CN | 102546379 A | 7/2012 |
| CN | 102550004 A | 7/2012 |
| CN | 103023799 A | 4/2013 |

OTHER PUBLICATIONS

International Search Report and Written Opinion from the International Application No. PCT/CN2014/086273, dated Dec. 17, 2014.

(Continued)

*Primary Examiner* — Jonathan Bui
(74) *Attorney, Agent, or Firm* — Zilka-Kotab, PC (57) ABSTRACT

In one embodiment, a system includes a switch controller configured to communicate with each of a plurality of network devices in a network, the switch controller including a processor and logic integrated with and/or executable by the processor, the logic being configured to: receive a request to instantiate a new workload or to move a current workload in the network, determine a throughput associated with the new or current workload, and select an optimum location to place the new workload or to move the current workload in the network based on the throughput associated with the new or current workload. According to another embodiment, a method includes receiving a request at a switch controller to instantiate or move a workload, determining a throughput associated with the workload, and selecting an optimum location to place or move the workload based on the throughput associated with the workload.

18 Claims, 5 Drawing Sheets

(51) Int. Cl.
*H04L 12/931* (2013.01)
*H04L 12/715* (2013.01)

(56) References Cited

U.S. PATENT DOCUMENTS

| | | | |
|---|---|---|---|
| 8,370,496 B1 | 2/2013 | Marr | |
| 8,396,807 B1 | 3/2013 | Yemini et al. | |
| 2008/0261597 A1* | 10/2008 | Hayama | H04W 36/30 455/436 |
| 2010/0138146 A1* | 6/2010 | Vogt | G01C 21/3632 701/533 |
| 2011/0078303 A1 | 3/2011 | Li et al. | |
| 2012/0131163 A1* | 5/2012 | Ganapathi | H04L 67/1004 709/223 |
| 2013/0297798 A1* | 11/2013 | Arisoylu | H04L 67/1027 709/226 |
| 2014/0101100 A1* | 4/2014 | Hu | H04L 67/1002 707/617 |
| 2014/0337834 A1* | 11/2014 | Adogla | G06F 9/45533 718/1 |

OTHER PUBLICATIONS

Moore et al., "Making Scheduling "Cool": Temperature-Aware Workload Placement in Data Centers," 2005 USENIX Annual Technical Conference, USENIX Association, pp. 61-74.

Spi Dst et al., "Calculating the Maximum Mean Data Rate in foal Area Networks," IPCOM000131605D, IEEE Computer, vol. 16, No. 5, May 1, 1983, pp. 72-76.

Tate et al., "Designing and Optimizing an IBM storage Area Network," ibm.com/redbooks, May 2002, pp. 1-536.

\* cited by examiner

WORKLOAD DEPLOYMENT WITH REAL-TIME CONSIDERATION OF GLOBAL NETWORK CONGESTION

BACKGROUND

The present invention relates to data center infrastructure, and more particularly, this invention relates to workload deployment with real-time consideration of global network congestion, particularly in software defined networks (SDNs).

A common practice for SDN controllers is to use the OpenFlow protocol to control and maintain a logical OpenFlow domain or a switch cluster comprising a plurality of switches therein. However, any other protocol may be used to control and maintain these domains. As workloads are deployed or moved across the domain, server utilization aspects and characteristics are taken into consideration in making a decision on the optimal place to deploy the workload. However, even in cases where network utilization is taken into consideration, it is limited to an aggregate amount of Input/Output (I/O) that each workload needs compared to the available I/O on the server. This localized consideration may lead to unintended consequences where certain parts of the network may become congested due to insufficient visibility related to where to deploy a workload.

SUMMARY

In one embodiment, a system includes a switch controller configured to communicate with each of a plurality of network devices in a network, the switch controller including a processor and logic integrated with and/or executable by the processor, the logic being configured to: receive a request to instantiate a new workload or to move a current workload in the network, determine a throughput associated with the new or current workload, and select an optimum location to place the new workload or to move the current workload in the network based on the throughput associated with the new or current workload.

In another embodiment, a computer program product for deploying a workload in a network, the computer program product including a computer readable storage medium having program code embodied therewith, the program code readable/executable by a processor to: receive, using the processor, a request to instantiate a new workload or to move a current workload in a network, determine a throughput associated with the new or current workload, and select an optimum location to place the new workload or to move the current workload in the network based on the throughput associated with the new or current workload.

According to another embodiment, a method for deploying a workload in a network includes receiving a request at a switch controller to instantiate a new workload or to move a current workload in a network, determining a throughput associated with the new or current workload, and selecting an optimum location to place the new workload or to move the current workload based on the throughput associated with the new or current workload.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

In order to determine optimum placement of one or more workloads in a network, such as a software defined network (SDN), the impact that their placement will have on the overall performance of a network may be taken into consideration and used to determine the placement of the workloads. These workloads may represent instantiation of a new virtual machine (VM) or expansion of tasks being performed by an existing VM on a server. This consideration may be made using a SDN controller connected to each switch in the SDN that controls the physical fabric and performs network virtualization through virtual switches hosted by virtualization platforms in various servers. In this way, the impact of the placement of the workloads on congestion in the network may be determined and accounted for, thereby providing better performance than currently employed methods.

In one general embodiment, a system includes a switch controller configured to communicate with each of a plurality of network devices in a network, the switch controller including a processor and logic integrated with and/or executable by the processor, the logic being configured to: receive a request to instantiate a new workload or to move a current workload in the network, determine a throughput associated with the new or current workload, and select an optimum location to place the new workload or to move the current workload in the network based on the throughput associated with the new or current workload.

In another general embodiment, a computer program product for deploying a workload in a network, the computer program product including a computer readable storage medium having program code embodied therewith, the program code readable/executable by a processor to: receive, using the processor, a request to instantiate a new workload or to move a current workload in a network, determine a throughput associated with the new or current workload, and select an optimum location to place the new workload or to move the current workload in the network based on the throughput associated with the new or current workload.

According to another general embodiment, a method for deploying a workload in a network includes receiving a request at a switch controller to instantiate a new workload or to move a current workload in a network, determining a throughput associated with the new or current workload, and selecting an optimum location to place the new workload or to move the current workload based on the throughput associated with the new or current workload.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, semiconductor, or infrared system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), a Blu-Ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fiber, etc.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN), storage area network (SAN), and/or a wide area network (WAN), any virtual networks, or the connection may be made to an external computer, for example through the Internet using an Internet Service Provider (ISP).

Aspects of the present invention are described herein with reference to flowchart illustrations and/or block diagrams of methods, apparatuses (systems), and computer program products according to various embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
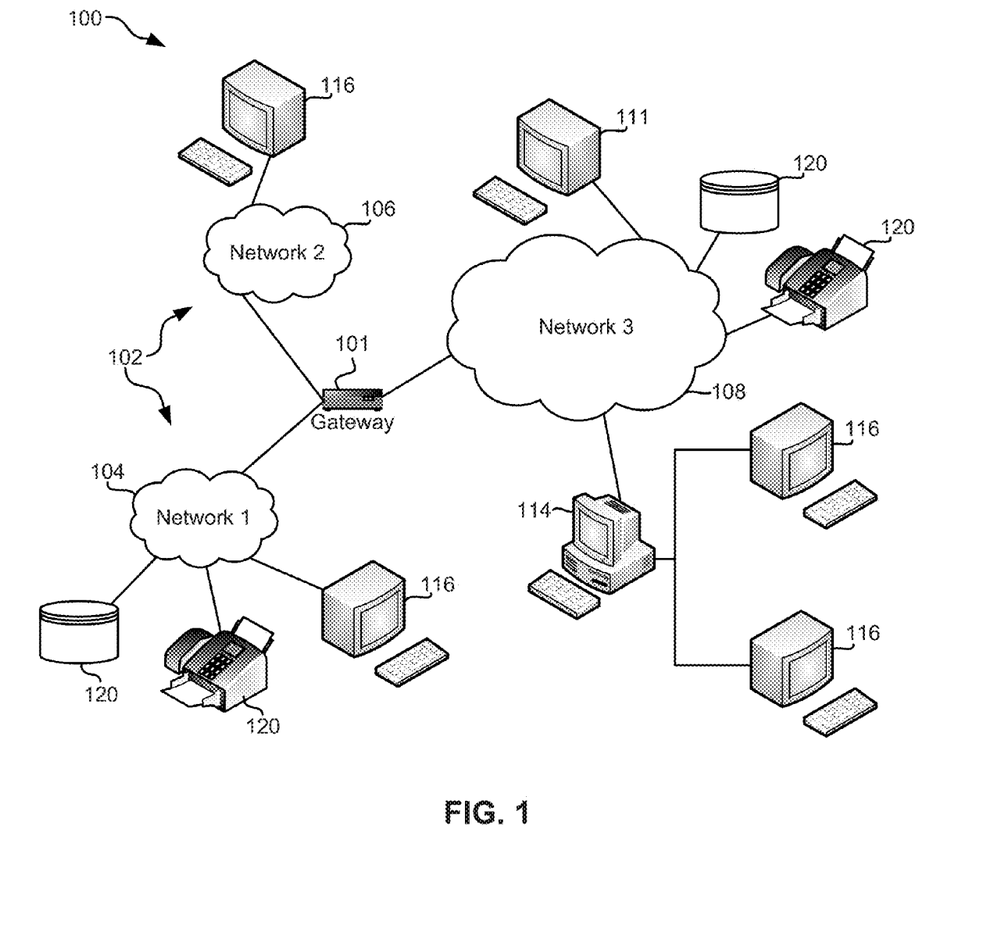
FIG. 1 illustrates a network architecture, in accordance with one embodiment.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a VLAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
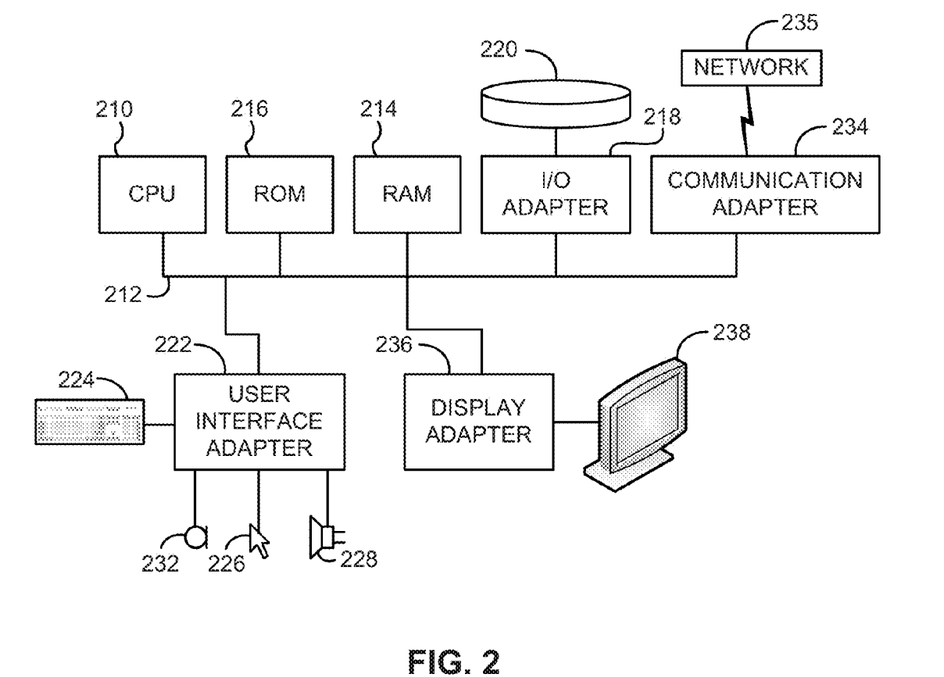
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit (CPU) 210, such as a microprocessor, and a number of other units interconnected via one or more buses 212 which may be of different types, such as a local bus, a parallel bus, a serial bus, etc., according to several embodiments.

The workstation shown in FIG. 2 includes a Random Access Memory (RAM) 214, Read Only Memory (ROM) 216, an I/O adapter 218 for connecting peripheral devices such as disk storage units 220 to the one or more buses 212, a user interface adapter 222 for connecting a keyboard 224, a mouse 226, a speaker 228, a microphone 232, and/or other user interface devices such as a touch screen, a digital camera (not shown), etc., to the one or more buses 212, communication adapter 234 for connecting the workstation to a communication network 235 (e.g., a data processing network) and a display adapter 236 for connecting the one or more buses 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
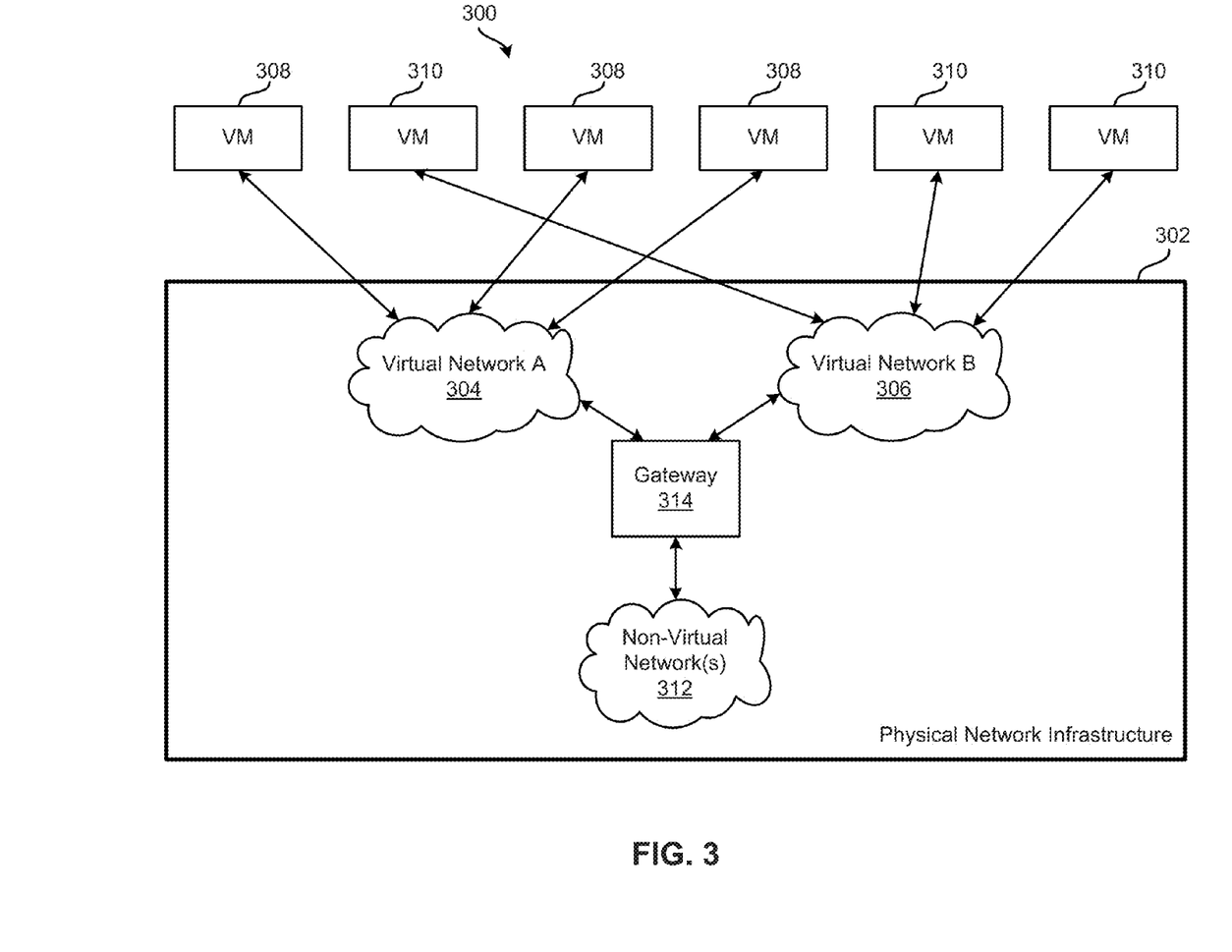
FIG. 3 is a simplified diagram of a virtualized data center, according to one embodiment.

Referring now to FIG. 3, a conceptual view of an overlay network 300 is shown according to one embodiment. The overlay network may utilize any overlay technology, standard, or protocol, such as a Virtual eXtensible Local Area Network (VXLAN), Distributed Overlay Virtual Ethernet (DOVE), Network Virtualization using Generic Routing Encapsulation (NVGRE), etc.

In order to virtualize network services, other than simply providing a fabric communication path (connectivity) between devices, services may be rendered on packets as they move through the gateway 314 which provides routing and forwarding for packets moving between the non-virtual network(s) 312 and the Virtual Network A 304 and Virtual Network B 306. The one or more virtual networks 304, 306 exist within a physical (real) network infrastructure 302. The network infrastructure 302 may include any components, hardware, software, and/or functionality typically associated with and/or used in a network infrastructure, including, but not limited to, switches, connectors, wires, circuits, cables, servers, hosts, storage media, operating systems, applications, ports, I/O, etc., as would be known by one of skill in the art. This network infrastructure 302 supports at least one non-virtual network 312, which may be a legacy network.

Each virtual network 304, 306 may use any number of virtual machines (VMs) 308, 310. In one embodiment, Virtual Network A 304 includes one or more VMs 308, and Virtual Network B 306 includes one or more VMs 310. As shown in FIG. 3, the VMs 308, 310 are not shared by the virtual networks 304, 306, but instead are exclusively included in only one virtual network 304, 306 at any given time.

According to one embodiment, the overlay network 300 may include one or more cell switched domain scalable fabric components (SFCs) interconnected with one or more distributed line cards (DLCs).

By having a "flat switch" architecture, the plurality of VMs may move data across the architecture easily and efficiently. It is very difficult for VMs, generally, to move across Layer-3 (L3) domains, between one subnet to another subnet, internet protocol (IP) subnet to IP subnet, etc. But if it the architecture is similar to a large flat switch, in a very large Layer-2 (L2) domain, then the VMs are aided in their attempt to move data across the architecture.

Figure 4:
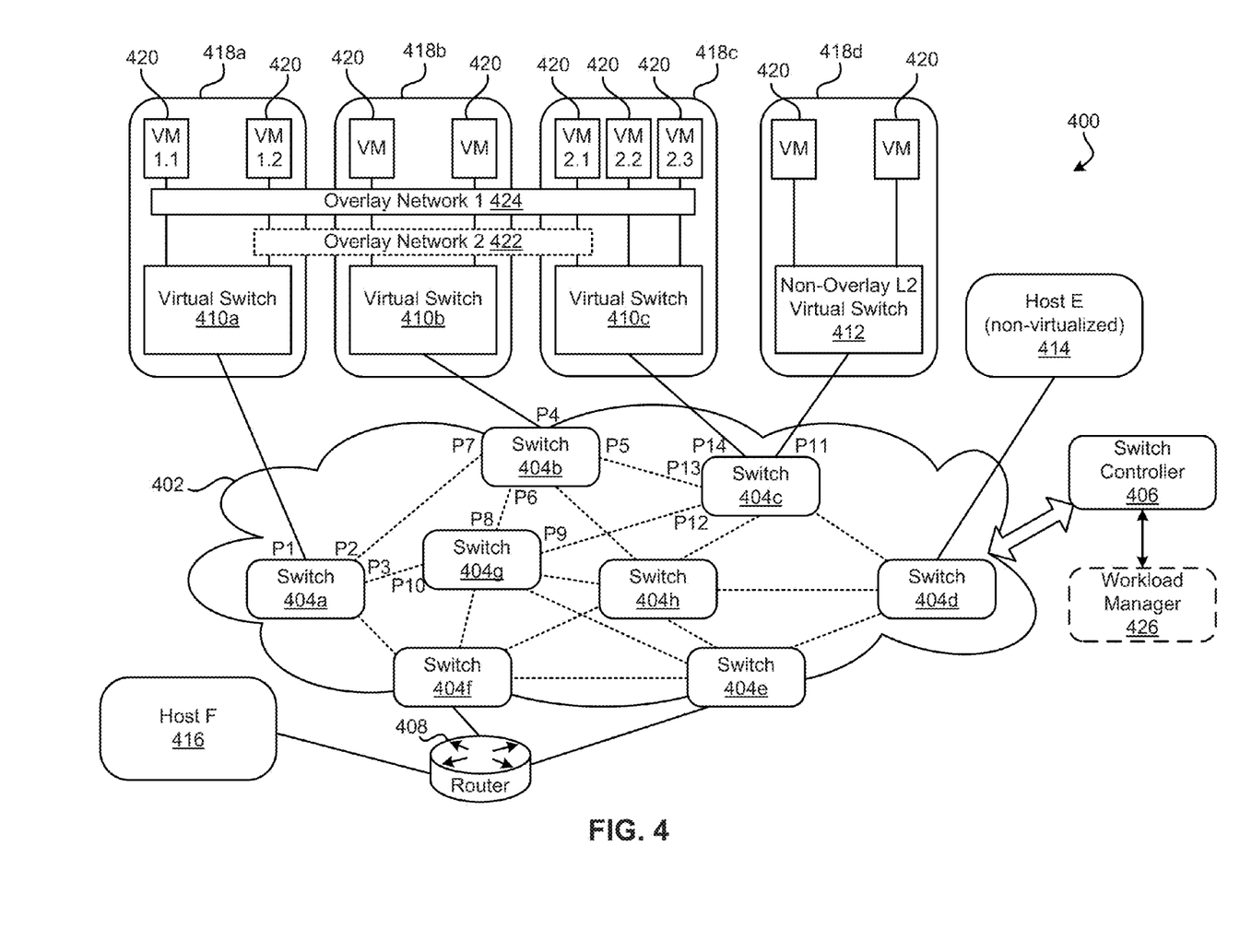
FIG. 4 is a simplified diagram of a software-defined network (SDN), according to one embodiment.

FIG. 4 shows a simplified topological diagram of a SDN system 400 that includes a switch domain or cluster 402, according to one embodiment. The switch cluster 402 comprises a plurality of switches 404a, 404b, ..., 404n, each switch 404a, 404b, ..., 404n, being connected to at least one other switch 404a, 404b, ..., 404n in the cluster 402. The switches that are explicitly shown (Switches 404a, 404b, 404c, 404d, 404e, 404f, 404g, and 404h) are for exemplary purposes only, as more or less switches 404a, 404b, ..., 404n than those explicitly shown may be present in the switch cluster 402. An L3 aware switch controller 406, such as an SDN controller, is connected to each switch 404a, 404b, ..., 404n in the switch cluster 402, either directly or via one or more additional connections and/or devices. Additionally, some switches 404a, 404b, ..., 404n are connected to one or more other virtual or physical devices external to the switch cluster 402. For example, Switch 404a is connected to virtual switch (vSwitch) 410a, Switch 404f is connected to Router 408, Switch 404c is connected to non-overlay L2 vSwitch 412 and vSwitch 410c, etc. Of course, these connections are for exemplary purposes only, and any arrangement of connections, number of switches 404a, 404b, ..., 404n in the switch cluster 402, and any other details about the system 400 may be adapted to suit the needs of whichever installation it is to be used in, as would be understood by one of skill in the art.

The system 400 also has several devices outside of the switch cluster 402, such as Host F 416 which is connected to the switch cluster 402 via Router 408 and non-virtualized Host E 414 which is connected to the switch cluster 402 via Switch 404d, etc. Also capable of being connected to the switch cluster 402 is a non-overlay L2 virtual switch 412 that is supported by a physical server 418d. This server may also host VMs 420.

Four servers 418a, 418b, 418c, 418d are shown hosting a plurality of VMs 420, each server 418a, 418b, 418c, 418d having a virtualization platform or hypervisor (such as Hyper-V, KVM, Virtual Box, VMware Workstation, etc.) which hosts the VMs 420. Furthermore, the three servers 418a, 418b, 418c which have VMs 420 in overlay networks (either overlay network 422 or 424) also include a Switch 410a, 410b, 410c, respectively, which may or may not be capable of communicating in the overlay network. The hosted VMs 420 on the various servers 418a, 418b, 418c, 418d may be included in one or more overlay networks, such as Overlay networks 1 or 2 (422 or 424, respectively). How the VMs 420 are divided amongst the overlay networks is a design consideration that may be chosen upon implementing the system 400 and adjusting according to needs and desires. Also, server 418d has a non-overlay L2 vSwitch 412 which is not capable of communicating in any overlay network 422, 424.

The number of various devices (e.g., Router 408, server 418a, Host F 416, etc.) connected to the switch cluster 402 are for exemplary purposes only, and not limiting on the number of devices which may be connected to a switch cluster 402.

Each device in the system 400, whether implemented as a physical or a virtual device, and regardless of whether it is implemented in hardware, software, or a combination thereof, is described as having an internet protocol (IP) address and/or a media access control (MAC) address.

Some of the concepts used herein are now described with reference to FIG. 4. Each of the switches 404a, 404b, . . . , 404n in the switch cluster 402 are capable of understanding commands from and exchanging information with the switch controller 406. In order to implement this arrangement, each switch 404a, 404b . . . . , 404n may adhere to OpenFlow standards/protocol, or some other suitable architecture or protocol known in the art. Furthermore, the switch controller 406 is also capable of communicating according to the selected protocol in order to exchange information with each switch 404a, 404b, . . . , 404n in the switch cluster 402.

The switch cluster 402 may be referred to as an OpenFlow Cluster when it includes a collection of contiguous OpenFlow switches which act as a single entity with multiple interfaces to external devices. Also, the switch controller 406 is capable of obtaining historical usage, statistics, performance data, and other useful information from each switch in the cluster 402, thereby allowing the switch controller 406 to determine how placement of a workload will affect the cluster 402.

To enable this deterministic approach to workload placement, each network device, such as switches 404a, 404b, . . . , 404n, servers 418a, 418b, 418c, 418d, hosts 414, 416, routers 408, etc., in the physical fabric of the system 400 are configured to produce, record and/or transmit statistics. These statistics may be transmitted to the switch controller 406 for analysis.

The statistics may include any useful information in placing a workload, such as latency of the network device, current throughput (average or real-time, with the averaging occurring over a certain time period, e.g., 10 sec., 1 min., 1 hr., 1 day, 1 week, etc.), total capacity of the network device, available capacity of the network device (average or real-time), etc. These statistics may be recorded on a per-port basis (such as a per-egress port basis or a per-ingress port basis), on a per-path basis, etc. In one approach, how the statistics are recorded may be based, at least in part, on how the network device implements queuing and statistics recording. Therefore, each network device may record different statistics or record and store the statistics in different ways.

From these statistics, the switch controller 406 is configured to determine how the placement of an additional workload (such as a new VM 420 on a server 418a, 418b, 418c, 418d) will affect the system 400. The switch controller 406 is configured to use some or all of the statistics collected from each network device in making sense of the performance characteristics of the fabric prior to instantiating a new workload therein or expanding the tasks for an existing workload (VM).

The statistics may be recorded on a per-port basis for each network device and in aggregate across the entire fabric (all ports from all network devices, mapped in a cohesive form for evaluation thereof). For example, the switch controller 406 may be configured to determine whether an additional workload will cause a prospective port or switch 404a, 404b, . . . , 404n in aggregate to reach its maximum threshold of operation in terms of at least latency and throughout.

In order to make this determination, the switch controller 406 may build a construct capable of representing at least the latency and throughput for each port on each network device within the physical fabric. In one embodiment, this construct may take the form of a table, database, or other suitable visualization of the path's information. According to one embodiment, a construct for the data may take the form of Table 1, below, which represents exemplary data for devices shown in FIG. 4.

TABLE 1

Exemplary Construct for Representation of Network Device Information

| Switch | Port | Latency | Current Throughput | Total Capacity | Available Capacity |
|--------|------|---------|--------------------|-----------------|---------------------|
| 404a | P1 | 600 ns | 5.5 Gb/s | 6.0 Gb/s | 0.5 Gb/s |
| 404b | P7 | 700 ns | 7.0 Gb/s | 10.0 Gb/s | 3.0 Gb/s |
| 404g | P9 | 500 ns | 1.1 Gb/s | 10.0 Gb/s | 8.9 Gb/s |

In another embodiment, the switch controller 406 may utilize a construct which represents each path through the fabric, including any set of redundant paths through the fabric, so that a path between any two devices is capable of being analyzed for at least latency and throughput in regards to the addition of a workload somewhere along the path.

In the vSwitches 410a, 410b, 410c of each server 418a, 418b, 418c, 418d, on a per-VM 420 (per-workload) basis, the endpoint that each vSwitch 410a, 410b, 410c most frequently communicates with is recorded along with a rate at which each vSwitch 410a, 410b, 410c communicates therewith, in one embodiment. The endpoint may be recorded as an IP address, a MAC address, or according to any other suitable identifying characteristic of the endpoint.

For example, if vSwitch 410a communicates with non-overlay L2 vSwitch 412 most frequently, the port from vSwitch 410a used in the communication path to non-overlay L2 vSwitch 412 is recorded, along with the ingress port at the non-overlay L2 vSwitch 412, and the throughput and latency of the two vSwitches.

The per-VM statistics may also be stored as part of a profile of each VM 420 in the switch controller 406 or elsewhere (which is accessible by the switch controller 406) to help make decisions as to where to deploy a new workload at a later time. This may be used when real time data is not available, or as a secondary calculation that may be incorporated into the decision as to where to deploy a new workload. This information may be recorded for each of the workloads (e.g., VMs) that a particular workload (in this case, the workload may be a VM 420 on server 418b) is communicating with most frequently such as in a construct shown in Table 2, below.

TABLE 2

Exemplary Construct for Representation of Most Common Workload Communication Information

| Server | Workload | Address | Throughput |
|---|---|---|---|
| 418a | VM1.1 | MAC M1.1 | 0.3 Gb/s |
|  | VM1.2 | MAC M1.2 | 0.1 Gb/s |
| 418c | VM2.1 | MAC M2.1 | 1.1 Gb/s |
|  | VM2.2 | MAC M2.2 | 0.7 Gb/s |
|  | VM2.3 | MAC M2.3 | 0.4 Gb/s |

The switch controller 406 may periodically or in response to some event, change, or circumstance being identified, poll both the virtualization layer vSwitches 410a, 410b, 410c and/or various physical switches 404a, 404b, . . . , 404n in order to collect these statistics, according to one embodiment. In another embodiment, the various vSwitches 410a, 410b, 410c and/or physical switches 404a, 404b, . . . , 404n may transmit this information to the switch controller 406 without the switch controller 406 needing to request the information. In another embodiment, both polling and non-requested transmissions may be used to provide these statistics to the switch controller 406.

The system 400 may also include a workload manager 426, in some approaches, such as a workload manager from Openstack, V-center, etc. This workload manager 426 may operate on the switch controller 406 or independently therefrom. When a new workload is to be deployed or moved, the workload manager 426 may provide a selection of server 418a, 418b, 418c, 418d candidates to the switch controller 406 based on local optimization criteria for fabric performance, or based on any desired algorithm for performance of the fabric, latency, throughput, etc.

In another embodiment, the switch controller 406 may make this determination without the aid of a workload manager 426. The switch controller 406 is configured to utilize VM/workload statistics to compute one or more paths (for use in systems requiring redundant paths) for the endpoints that the VM most frequently communicates with and does this step with each candidate server that the VM is capable of being deployed on. For each path, the switch controller 406 computes the repercussions or effects of the new workload using each switch in turn using the path information and the per-switch and/or per-port statistics it has access to which has been gathered from the physical switches 404a, 404b, . . . , 404n.

Based on these computations, the switch controller 406 determines which server 418a, 418b, 418c, 418d placement causes the least congestion (and/or best overall latency in the system 400) and is therefore an ideal server for placement of the new workload.

When a workload manager 426 is used, this information is returned to the workload manager 426 in order to deploy or move the workload appropriately.

In one example, some characteristics for network devices in system 400 may be assumed. In this example, the switches 404a, 404b, and 404g may be assumed to have the ports listed, throughput, and latency as shown in Table 3 below. For the sake of this example, it is assumed that each port is a 10 Gb/s port. In addition, some historical requirements are also assumed in that the new workload would communicate with at least one of the VMs on server 418a with a 3.0 Gb/s throughput requirement, as this is assumed to be the most frequent communication partner for the new workload.

TABLE 3

Exemplary Switch Information

| Switch | Port | Latency | Throughput Used |
|---|---|---|---|
| 404a | P1 | 600 ns | 5.5 Gb/s |
|  | P2 | 550 ns | 4.7 Gb/s |
|  | P3 | 600 ns | 8.3 Gb/s |
| 404b | P4 | 400 ns | 2.1 Gb/s |
|  | P5 | 650 ns | 6.0 Gb/s |
|  | P6 | 800 ns | 5.5 Gb/s |
|  | P7 | 700 ns | 7.0 Gb/s |
| 404g | P8 | 450 ns | 2.0 Gb/s |
|  | P9 | 500 ns | 1.1 Gb/s |
|  | P10 | 300 ns | 3.7 Gb/s |
| 404c | P11 | 600 ns | 4.3 Gb/s |
|  | P12 | 700 ns | 4.1 Gb/s |
|  | P13 | 450 ns | 9.0 Gb/s |
|  | P14 | 650 ns | 3.5 Gb/s |

With these exemplary statistics, it may be determined which server 418a, 418b, 418c, 418d it would be better to place a new workload (VM 420) on. In this example, each possible location must be determined, along with each path between the most frequent communication partners (the VMs 420 on server 418a and 418b) and the possible location being analyzed. For the sake of brevity, only a few such calculations will be shown, but it is to be repeated for each possible location (on any of the servers 418a, 418b, 418c, 418d).

If the new workload (assumed to be 3.0 Gb/s) was placed on server 418b, the paths to the most frequent communication partner (server 418a) would be P4-P7-P2-P1, P4-P6-P8-P10-P3-P1, P4-P5-P13-P12-P9-P10-P3-P1, etc. The shortest path is examined now, where the throughput used after placement of the new workload is shown in parenthesis after each port (a number over 10 indicates that the placement of the workload would cause congestion in the system 400): P4(5.1)-P7(10.0)-P2(7.7)-P1(8.5). According to this calculation, path P4-P7-P2-P1 would be capable of handling the placement of the new workload on server 418b, but one port would be maxed out and incapable of providing any further bandwidth.

In contrast, another calculation indicates the opposite. Specifically, for placement of the new workload on server 418c, and taking the shortest path, the calculation would result in the following path: P14(6.5)-P13(12)-P5(9)-P7(10.0)-P2(7.7)-P1(8.5). Obviously, port P13 would exceed the threshold of 10 Gb/s and would result in congestion. This is undesirable, and therefore this path would not be chosen; furthermore, if no other paths between server 418c and server 418a are capable of handling the workload's throughput requirements, then the workload should not be placed on server 418c.

These calculations are repeated for each possible location (taking into account any latency requirement for the paths or traffic of the new workload) and each possible path between the placement location and the most frequent communication partner(s).

For an exemplary latency calculation, it is assumed that the new workload demands a latency of less than 2500 ns. For the above described path, with the latency at each port indicated in parenthesis: P14(650)-P13(450)-P5(650)-P7(700)-P2(550)-P1(600), the total latency for this path is 3600 ns, greater than the allowable 2500 ns. Accordingly, this path would also not be desired due to it failing the latency requirement of the new workload.

Of course, if no path achieves both the throughput and latency (if any) requirements for the new workload, the path (and location associated therewith) which provides the best performance may be selected for placement of the new workload.

Figure 5:
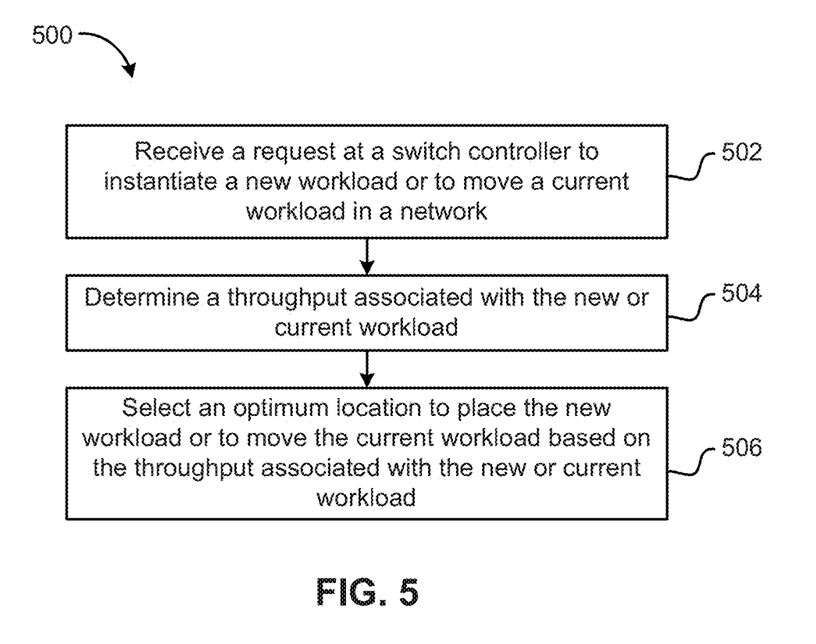
FIG. 5 is a flowchart of a method, according to one embodiment.

Now referring to FIG. 5, a method 500 for deploying a workload in a network is shown according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in one embodiment, the method 500 may be partially or entirely performed by a domain comprising a plurality of switches, one or more vSwitches hosted by one or more servers, a server, a switch, a switch controller (such as a SDN controller, OpenFlow controller, etc.), a processor, e.g., a CPU, an application specific integrated circuit (ASIC), a field programmable gate array (FPGA), etc., one or more network interface cards (NICs), one or more virtual NICs, one or more virtualization platforms, or any other suitable device or component of a network system or cluster.

In operation 502, a request is received at a switch controller to instantiate a new workload or to move a current workload in a network. This request may be produced by the switch controller, a workload manager, or some other network device, user, server, host, etc.

In operation 504, a throughput associated with the new or current workload is determined. The throughput is representative of how much bandwidth the new or current workload will require for its produced traffic once it is instantiated or moved.

In operation 506, an optimum location to place the new workload or to move the current workload is selected based on the throughput associated with the new or current workload. In one embodiment, this selection may include determining one or more most frequent communication partners for the new or current workload in the network, determining a plurality of possible locations to instantiate the new workload or to move the current workload, determining a plurality of possible paths between each possible location and the one or more most frequent communication partners, and determining which of the plurality of possible paths are capable of handling the throughput associated with the new or current workload.

The one or more most frequent communication partners may be any network device in the network, such as a VM on a server, a host, a server, etc. Any server or host capable of handling a new workload (VM) is included in the plurality of possible locations, including a server or host which is providing for the one or more most frequent communication partners.

In addition, between each possible location and the one or more most frequent communication partners, there are a plurality of possible paths in which traffic may be sent. Each of these paths is determined between each possible location and the one or more most frequent communication partners.

In a further embodiment, selecting the optimum location to place the new workload or to move the current workload based on the throughput associated with the new or current workload may further comprise determining a possible location which has one or more shortest paths from the plurality of possible paths that are capable of handling the throughput and selecting the possible location associated with the one or more shortest paths to be the optimum location. The shortest path is a concept understood by one of skill in the art, and since more than one such shortest path may exist between any two devices in the network, each such path is taken into consideration.

In another further embodiment, the method 500 may further include determining a latency associated with the new workload or the current workload. In this embodiment, the determining which of the plurality of possible paths are capable of handling the throughput associated with the new or current workload may further comprise determining which of the plurality of possible paths are capable of providing the latency associated with the new workload or the current workload. Also in this embodiment, the selecting the optimum location to place the new workload or to move the current workload may be further based on the latency associated with the new workload or the current workload.

The method 500 may also include receiving statistics from each port in the network describing at least throughput associated with each port in the network. In addition to throughput, latency for each port may also be included in the statistics. Furthermore, the throughput may be a current (real-time) throughput or an average throughput that is averaged over a certain time period.

The method 500 may be implemented in any desired setting, machine, device or apparatus. In one such embodiment, a system may include a network comprising a plurality of network devices (such as switches, routers, vSwitches on servers, etc.) and a switch controller in communication with each of the plurality of network devices. The switch controller includes a processor (such as a CPU, ASIC, FPGA, microprocessor, etc.) and logic (hardware, software, or a combination thereof) integrated with and/or executable by the processor. In this embodiment, the logic may be configured to execute some or all of method 500.

According to another embodiment, a computer program product for deploying a workload in a network may include a computer readable storage medium having program code embodied therewith. In this embodiment, the program code may be readable/executable by a processor to execute some or all of method 500.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
a switch controller configured to communicate with each of a plurality of network devices in a network, the switch controller comprising a hardware processor and logic integrated with and/or executable by the processor, the logic being configured to:
receive a request to instantiate a new workload or to move a current workload in the network;
determine a throughput associated with the new or current workload; and
select an optimum location to place the new workload or to move the current workload in the network based on the throughput associated with the new or current workload,
wherein the logic configured to select the optimum location to place the new workload or to move the current workload based on the throughput associated with the new workload or the current workload is configured to:

determine one or more most frequent communication partners for the new or current workload in the network;

determine a plurality of possible locations to instantiate the new workload or to move the current workload;

determine a plurality of possible paths between each possible location and the one or more most frequent communication partners; and determine which of the plurality of possible paths are capable of handling the throughput associated with the new or current workload.

2. The system as recited in claim 1, wherein the logic configured to select the optimum location to place the new workload or to move the current workload based on the throughput associated with the new or current workload is further configured to:

determine a possible location which has one or more shortest paths from the plurality of possible paths that are capable of handling the throughput; and select the possible location associated with the one or more shortest paths to be the optimum location.

3. The system as recited in claim 2, wherein the logic is further configured to determine a latency associated with the new workload or the current workload, wherein the logic configured to determine which of the plurality of possible paths are capable of handling the throughput associated with the new or current workload is further configured to determine which of the plurality of possible paths are capable of providing the latency associated with the new workload or the current workload, and wherein the logic configured to select the optimum location to place the new workload or to move the current workload is further based on the latency associated with the new workload or the current workload.

4. The system as recited in claim 1, wherein the logic is further configured to receive statistics from a plurality of ports in the network describing at least; throughput associated with each of the plurality of ports in the network, and a latency of each of the plurality of ports in the network.

5. The system as recited in claim 4, wherein the logic is further configured to build a construct that represents at least latency and throughput for at least one port on a plurality of network devices within a physical fabric of the network.

6. The system as recited in claim 4, wherein the throughput is either a current real-time throughput or a current average throughput measured over a predetermined period of time.

7. A computer program product for deploying a workload in a network, the computer program product comprising a computer readable hardware storage device having program code embodied therewith, the program code readable/executable by a processor to:

receive, using the processor, a request to instantiate a new workload or to move a current workload in a network;

determine a throughput associated with the new or current workload; and select an optimum location to place the new workload or to move the current workload in the network based on the throughput associated with the new or current workload, wherein the program code readable/executable by the processor to select the optimum location to place the new workload or to move the current workload based on the throughput associated with the new workload or the current workload is configured to:

determine one or more most frequent communication partners for the new or current workload in the network;

determine a plurality of possible locations to instantiate the new workload or to move the current workload;

determine a plurality of possible paths between each possible location and the one or more most frequent communication partners; and determine which of the plurality of possible paths are capable of handling the throughput associated with the new or current workload.

8. The computer program product as recited in claim 7, wherein the program code readable/executable by the processor to select the optimum location to place the new workload or to move the current workload based on the throughput associated with the new or current workload is further configured to:

determine a possible location which has one or more shortest paths from the plurality of possible paths that are capable of handling the throughput; and select the possible location associated with the one or more shortest paths to be the optimum location.

9. The computer program product as recited in claim 8, wherein the program code is further readable/executable by the processor to determine a latency associated with the new workload or the current workload, wherein the program code readable/executable by the processor to determine which of the plurality of possible paths are capable of handling the throughput associated with the new or current workload is further configured to determine which of the plurality of possible paths are capable of providing the latency associated with the new workload or the current workload, and wherein the program code readable/executable by the processor to select the optimum location to place the new workload or to move the current workload is further based on the latency associated with the new workload or the current workload.

10. The computer program product as recited in claim 7, wherein the program code readable/executable by the processor is further configured to receive statistics from a plurality of ports in the network describing at least throughput associated with each of the plurality of ports in the network.

11. The computer program product as recited in claim 10, wherein the statistics further describe a latency of each of the plurality of ports in the network.

12. The computer program product as recited in claim 10, wherein the throughput is either a current real-time throughput or a current average throughput measured over a predetermined period of time.

13. A method for deploying a workload in a network, the method comprising:

receiving a request at a switch controller to instantiate a new workload or to move a current workload in a network;

determining a throughput associated with the new or current workload; and selecting an optimum location to place the new workload or to move the current workload based on the throughput associated with the new or current workload by:

determining one or more most frequent communication partners for the new or current workload in the network;

determining a plurality of possible locations to instantiate the new workload or to move the current workload;

determining a plurality of possible paths between at least one possible location and the one or more most frequent communication partners; and determining which of the plurality of possible paths are capable of handling the throughput associated with the new or current workload.

14. The method as recited in claim 13, further comprising building a construct that represents at least latency and throughput for at least one port on a plurality of network devices within a physical fabric of the network.

15. The method as recited in claim 13, wherein the selecting the optimum location to place the new workload or to move the current workload based on the throughput associated with the new or current workload further comprises:
   determining a possible location which has one or more shortest paths from the plurality of possible paths that are capable of handling the throughput; and
   selecting the possible location associated with the one or more shortest paths to be the optimum location.

16. The method as recited in claim 15, further comprising determining a latency associated with the new workload or the current workload, wherein the determining which of the plurality of possible paths are capable of handling the throughput associated with the new or current workload further comprises determining which of the plurality of possible paths are capable of providing the latency associated with the new workload or the current workload, and wherein the selecting the optimum location to place the new workload or to move the current workload is further based on the latency associated with the new workload or the current workload.

17. The method as recited in claim 13, further comprising receiving statistics from a plurality of ports in the network describing at least throughput associated with each of the plurality of ports in the network.

18. The method as recited in claim 17, wherein the statistics further describe a latency of each of the plurality of ports in the network, and wherein the throughput is either a current real-time throughput or a current average throughput measured over a predetermined period of time.

\* \* \* \* \*